Dec. 20, 1938.　　　L. G. SIMJIAN　　　2,140,602
MULTIPLE POSE PHOTOGRAPHIC APPARATUS
Filed Oct. 2, 1937　　　2 Sheets-Sheet 1
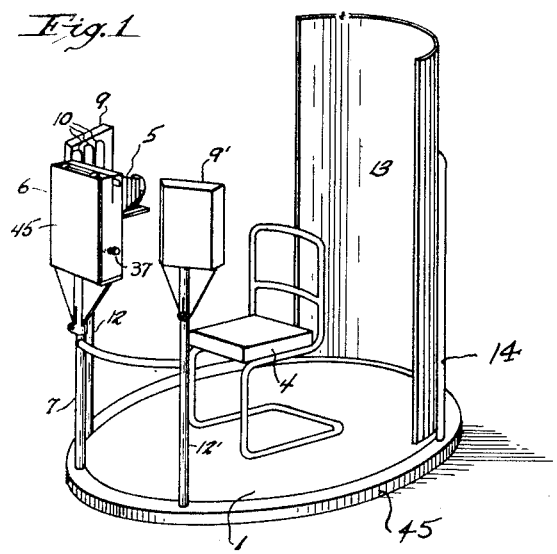
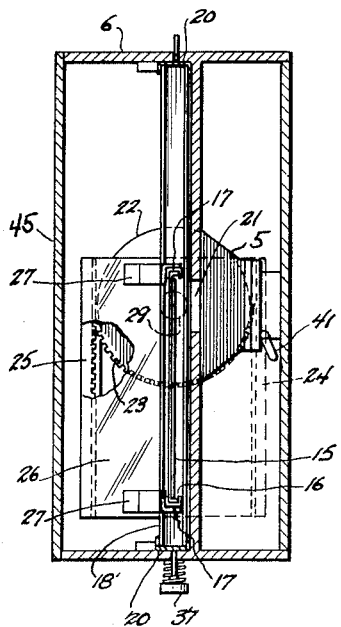
INVENTOR.
Luther G. Simjian
BY Paul B. Hunter
ATTORNEY.

Dec. 20, 1938.  L. G. SIMJIAN  2,140,602
MULTIPLE POSE PHOTOGRAPHIC APPARATUS
Filed Oct. 2, 1937  2 Sheets-Sheet 2
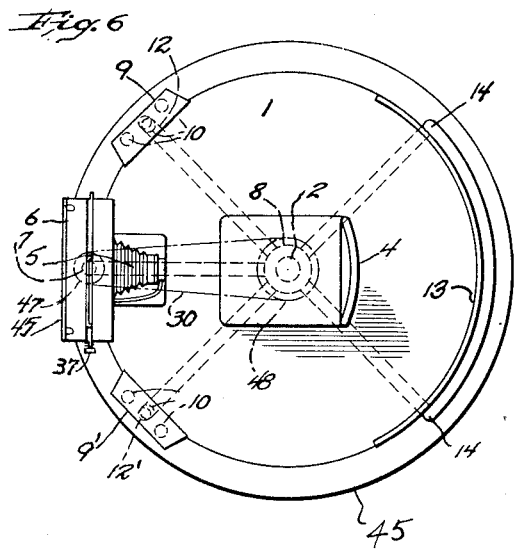
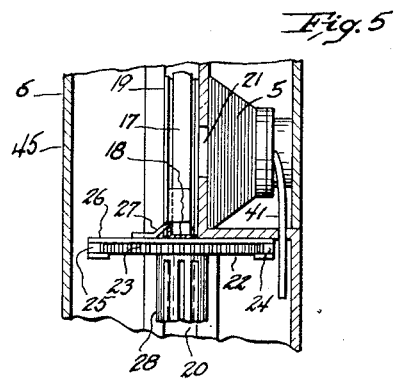
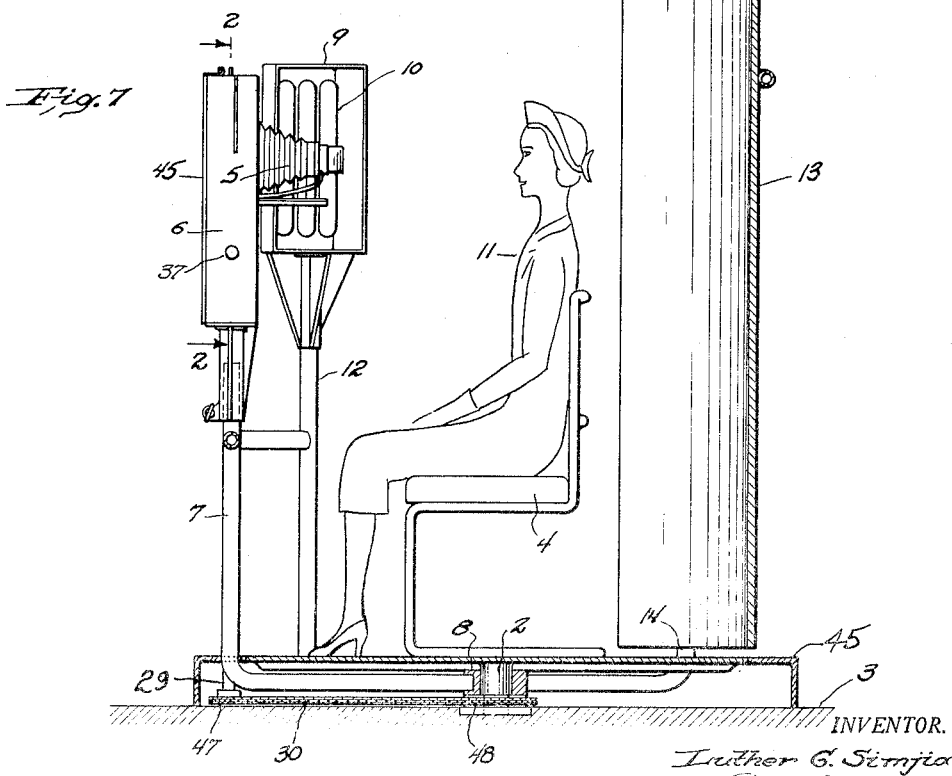
INVENTOR.
Luther G. Simjian,
BY Paul B. Hunter
ATTORNEY.

Patented Dec. 20, 1938

2,140,602

UNITED STATES PATENT OFFICE 2,140,602

MULTIPLE POSE PHOTOGRAPHIC APPARATUS

Luther G. Simjian, Riverside, Conn.

Application October 2, 1937, Serial No. 166,949

13 Claims. (Cl. 95—82)

This invention relates, generally, to obtaining photographs of a plurality of poses of a subject or object, and the invention has reference, more particularly, to a novel multiple pose photographic apparatus adapted for photographing the subject or object from a plurality of angles.

Heretofore, it has been generally necessary in taking photographs of persons or objects from various angles, to require the person to change his pose or to change the position of the object after each exposure. This is objectionable not only because of the fact that such changes in pose are time consuming, but the process requires undue exertion and effort on the part of the poser and photographer in order to secure such photographs.

The principal object of the present invention is to provide a novel multiple pose photographic apparatus that is so constructed and arranged as to enable the posing subject to remain in a fixed posture at the center of a posing area while the photographic camera is adapted to be moved around the subject for taking exposures from various angles, the resulting photographs representing differing poses of the subject.

Another object of the present invention lies in the provision of a novel multiple pose photographic apparatus of the above character, wherein the lighting system employed is movable as a unit along with the camera, as is also true of a background member, whereby the conditions under which the successive exposures are made are substantially identical, resulting in a uniform and high quality of product.

Still another object of the present invention is to provide a novel multiple pose photographic apparatus of the above character, wherein the camera is adapted to use a multiple exposure sensitized plate or film together with means for automatically moving the said plate or film as the camera is adjusted angularly about the subject, so that unexposed areas of the plate or film are presented for exposure at each successive operation of the camera, thereby eliminating the necessity of requiring the operator to change sensitized plates after each exposure.

Still another object of the present invention lies in the provision of a novel apparatus of the above character, so constructed and arranged that multiple exposures and overlapping exposures are prevented.

Other objects and advantages will become apparent from the specification, taken in connection with the accompanying drawings wherein one embodiment of the invention is illustrated.

In the drawings,

Fig. 1 is a perspective view of the novel multiple pose photographic apparatus of the present invention.

Fig. 2 is an enlarged vertical sectional view of the camera casing.

Fig. 3 is a sectional view taken along the line 3—3 of Fig. 2.

Fig. 4 is an enlarged sectional view taken along line 4—4 of Fig. 2.

Fig. 5 is a fragmentary sectional view taken along line 5—5 of Fig. 2.

Fig. 6 is a plan view of the apparatus; and

Fig. 7 is a view in side elevation, with parts broken away, of the apparatus.

Similar characters of reference are used in all of the above figures to indicate corresponding parts.

Referring now to the several figures of the drawings, the reference numeral 1 designates a circular platform that is supported by a central pedestal 2 resting as upon the floor 3. A chair 4 is positioned at the center of platform 1 in the event the subject desires to be photographed while sitting, this chair being removed when the subject is to stand while taking the photographs. A camera 5 has its casing 6 mounted upon a vertical post 7, which post or arm extends down and under the platform 1 and has its lower inner end secured to and carried by a sleeve 8 turnably mounted on the pedestal 2. Lighting units 9 and 9' are positioned on opposite sides of the camera 5 and are arranged so as to direct light from the lamps 10 onto the subject 11 at the center of the posing area. Lighting units 9 and 9' are mounted on posts or arms 12, 12' that extend downwardly and under the platform 1 and are also secured to the sleeve 8, turnable on pedestal 2. A background member 13, illustrated as of part-cylindrical shape in cross section, extends upwardly from platform 1 opposite the camera 5 and is carried by one or more posts or arms 14 that extend downwardly and under the platform 1 and are also secured to the sleeve 8. Thus, should the camera 5 be moved angularly around the platform 1, the lighting units and the background will also move with the camera while maintaining fixed angular relationship with respect thereto, inasmuch as all of these members are secured to and carried by the sleeve 8. Thus, by merely turning the camera 5, uniform pictures may be taken of the subject 11 from various angles, inasmuch as the lighting system and background remain the same in all cases. An apron 45 is shown carried by posts 7, 9, 9' and 14 at the periphery of platform 1.

In order to relieve the operator of the necessity of inserting a new plate each time a photograph is taken, the camera 5 is provided with a multiple exposure plate 15, as shown in Fig. 2. This plate is illustrated as having sixteen exposure areas 15', although it will be understood that a greater or lesser number of these areas may be provided. The plate 15 is adapted to be inserted downwardly into a vertical slot 16 provided in a film holder 17 that is free to slide transversely in upper and lower channels 18 and 18' that are rigidly interconnected at their ends by vertical channels or frame members 19, which in turn are adapted to slide vertically in slots 20, 20' provided in the side walls of the camera casing 6.

In order to move the film holder 17 transversely so as to bring successive exposure areas 15' of a horizontal row of exposure areas into registry with the central camera opening 21, suitable mechanism is provided. This mechanism is illustrated as consisting of a gear disc 22 having teeth 23 extending substantially 180° around the same, the remainder of the periphery of this gear disc being toothless. This disc is adapted to mesh with reversing racks 24, 25 that are provided along the forward and rear under surfaces of a plate or frame 26, which frame supports the film holder 17 by means of brackets 27. The frame 26 rests upon the gear disc 22, which disc is shown as having a depending hub 28 splined upon a vertical shaft 29, which shaft extends downwardly within the hollow post 7 supporting the camera 5. The lower end of shaft 29 projects downwardly through an aperture in the post 7 and has a sprocket 47 secured thereto that is driven by sprocket chain 30 passing around a sprocket 48 fixed upon the central pedestal 2.

The lower portion of the hub 28 has a radially projecting tongue 31 thereon for cooperating with a series of vertically spaced, stationary, annular steps 32, 33 and 34, which steps have diametrically opposite cut-out portions or slots 35 and 35' adapted to allow the tongue 31 to pass therethrough under the proper conditions of operation. A hinged bracket 36 is provided at each of the annular steps 32, 33, 34 to close one of the cut-out portions 35 or 35' thereof against downward movement of the tongue 31, while permitting upward movement of this tongue through the respective cut-out portion. By observing Fig. 2, it will be noted that the pivoted brackets 36 are staggered, whereby, while the uppermost bracket 36 closes cut-out portion 35 of step 32, the next lower bracket 36 closes the cut-out portion 35' of step 33, etc.

A shutter release plunger 37 is provided on the camera casing 6 and extends inwardly for cooperating with a shutter release lever 38 pivoted at 39 and adapted to actuate the flexible thrust shaft 40 connected through tubing 41 to the camera shutter. The inner end of plunger 37 is adapted to move into one of the vertical slots 42 provided in the hub 28 when an exposure is made.

In operation, a sensitized plate 15 is inserted into the film holder 17 from above, so as to rest in the position shown in Fig. 2, in which position the exposure area 15' at the lower left hand corner of plate or film 15 registers with the camera opening 21. In this position of the plate, a snap pawl 43 (see Fig. 4) registers with one of the slots 42 in hub 28, the tongue 31 of this hub resting upon the bracket 36 associated with annular step 32. To expose the film, it is merely necessary to press the plunger 37 inwardly, thereby causing a pin 44 on this plunger to actuate shutter release lever 38 and effect movement of the thrust shaft 40 to actuate the camera shutter release, thereby making an exposure at a definite angle with respect to the posing subject.

To now obtain another picture at a somewhat different angle, the operator merely grasps the camera casing 6 or post 7 and moves the camera angularly around the platform 1. In so doing, the sprocket chain 30 under platform 1 is caused to revolve the sprocket 47 on the lower end of shaft 29, and hence revolves this shaft, and since the hub of gear disc 2 is splined to shaft 29, this gear disc is caused to turn. Thus, assuming that the camera is moved clockwise as viewed in Fig. 6, the shaft 29 and gear disc 22 will be caused to turn counter-clockwise, thereby causing the teeth 23 of this gear disc, meshing with rack 24, to move this rack transversely with respect to the camera casing so that the supported film holder 17 is caused to slide along channels 18, 18' toward the left as viewed in Fig. 2, or upwardly as viewed in Fig. 3. When the camera has moved sufficiently so as to bring the next succeeding exposure area 15', i. e., the exposure area to the right of the previously exposed exposure area, into registry with the camera opening 21, the snap pawl 43 will snap into the next succeeding slot 42 of hub 28, the click thus produced serving to notify the operator that the second exposure area is properly positioned for taking a photograph. The release plunger 37 may now be pressed inwardly to make the exposure, the said plunger also entering one of the slots 42.

In the event that the camera is not moved sufficiently to bring the second exposure area 15' into registry with the camera opening 21, or should the camera over-travel, then no exposure can be made because the plunger 37 cannot be pressed inwardly due to the fact that the inner end thereof will abut the outer surface of hub 28 and will not enter into one of the grooves 42.

After the second exposure area has been exposed, further movement of the camera about the platform 1 will bring the third exposure area into position for exposure, such registration being indicated by the click of snap pawl 43, and the exposure being made possible because of the fact that the inner end of plunger 37 is permitted to enter one of the slots 42.

After all of the exposure areas of the lowermost row of exposure areas has been exposed, the tongue 31 will move into registry with the cut-out portion 35' of step 32, the teeth 23 of gear disc 22 moving out of engagement with rack 24 and the film holder 17 being now at the left hand limit of its travel, as viewed in Fig. 2. The tongue 31 and the parts supported thereby, namely, gear disc 22 and film holder 17 together with frame members 18, 18' and 19, will now move downwardly with hub 28 sliding downwardly on shaft 29 under the action of gravity until tongue 31 rests upon the bracket 36 of the next lower annular step 33. Continued angular movement of the camera about platform 1 in the same direction will now cause the teeth 23 of gear disc 22, now meshing with rack 25, to reverse the direction of movement of frame 26 to move the film holder 17 toward the right as viewed in Fig. 2, or downwardly as viewed in Fig. 3, thus successively exposing the exposure areas 15' of the second row thereof.

After the second row of exposure areas 15' has been exposed, the tongue 31 will arrive above cut-out portion 35 of annular step 33, whereupon this cut-out portion and the supported film holder 17 will drop down upon bracket 36 of annular step 34 preparatory to exposing the third row of exposure areas 15'.

In the meantime, the camera has steadily advanced around the platform 1 so that various angles of pose of the subject are photographed. Continued turning of the camera will now successively expose the exposure areas of the third row thereof while the gear disc 22, by coacting with rack 24, serves to move the film step by step toward the left, as viewed in Fig. 2. Finally, after this row has been fully exposed, the tongue 31 will drop through opening 35' of annular step 34 and come to rest upon the bottom of the casing 6 preparatory to exposing the uppermost row of exposure areas 15'. Continued movement of the camera now causes gear disc 22, by coacting with rack 25, to move the film toward the right in a step by step manner, for successively exposing the exposure areas 15' thereof.

When the film 15 has been fully exposed after taking sixteen photographs, the film holder 17 together with the gear disc 22 and hub 28 thereof may be bodily raised by opening the rear cover 45 of the camera casing 6, the brackets 36 enabling the tongue 31 to be raised vertically without the necessity of turning the hub 28.

It will be apparent that the camera may be moved in either direction about the subject in taking photographs and that the ratio of the sprocket gearing will determine the number of photographs taken during the total movement of the camera about the platform 1.

In using the apparatus of the present invention, it is thus obvious that without disturbing the subject 11, any number of photographs may be taken under uniform light and background conditions.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a multiple pose photographic apparatus adapted to produce multiple pose complete photographs of a still subject, a central posing area arranged to receive the subject, a camera movable in intermittent arcuate steps about said area for taking photographs of the subject at the end of each said steps, whereby the subject is photographed at various angles, and means for maintaining uniform conditions under which said photographs are taken.

2. In a multiple pose photographic apparatus, a central posing area, a camera movable in intermittent arcuate steps about said area for obtaining multiple photographs from various angles of a subject within said area, and background means behind the subject movable with said camera about said area.

3. In a multiple pose photographic apparatus, a camera arranged to move angularly in intermittent steps about a posing area, and lighting and reflector means movable with said camera for establishing uniform lighting conditions.

4. In a multiple pose photographic apparatus, a camera arranged to move angularly in arcuate steps about a posing area, and means for automatically advancing the film both transversely and vertically of said camera as the latter moves, whereby the same is adapted to photograph a subject from a plurality of angles.

5. In a multiple pose photographic apparatus, a camera arranged to move angularly in steps about a posing area, illuminating and background means movable with said camera about said area, said camera having a multiple exposure plate provided with a plurality of exposure areas, and means responsive to movement of said camera for moving said plate both horizontally and vertically so that successive exposure areas are intermittently presented for exposure by said camera.

6. A multiple pose photographic apparatus as defined in claim 5, wherein means is provided for preventing double or overlapping exposures of said plate exposure areas.

7. A multiple pose photographic apparatus comprising a substantially flat platform providing a posing area, a central supporting pedestal for said platform, a camera pivoted with respect to said pedestal for movement in intermittent arcuate steps about said platform, and lighting units movable with said camera about said platform.

8. A multiple pose photographic apparatus comprising a substantially flat platform providing a posing area, a central supporting pedestal for said platform, a camera pivoted with respect to said pedestal for movement in arcuate steps about said platform, said camera having an exposure plate provided with a plurality of exposure areas extending vertically and horizontally, a holder for said plate, and mechanism for moving said plate both vertically and horizontally so that differing exposure areas are successively disposed for exposure as said camera moves around said platform.

9. A multiple pose photographic apparatus comprising a circular platform providing a posing area, a central supporting pedestal for said platform, a camera pivoted with respect to said pedestal for movement about said platform, said camera having an exposure plate provided with a plurality of exposure areas, a holder for said plate, and mechanism for moving said plate so that differing exposure areas are successively disposed for exposure as said camera moves around said platform, said mechanism comprising reversing racks connected to said holder, and transmission means connected with said pedestal for operating said racks as said camera moves.

10. In a multiple pose photographic apparatus, a pedestal, a circular platform supported axially by said pedestal, a sleeve turnably mounted on said pedestal, arms fixed on said sleeve and extending radially outwardly under said platform and upwardly at the periphery thereof, a camera carried by one of said arms for photographing objects positioned on said platform, and a background member carried by another of said arms opposite said camera.

11. In a multiple pose photographic apparatus, a pedestal, a circular platform supported axially by said pedestal and providing a central posing area, arms pivoted on said pedestal and extending radially outwardly under said platform and upwardly at the periphery thereof, a camera carried by one of said arms, said camera being angularly movable for photographing subjects positioned on said posing area from various angles, a lighting unit associated with said camera and movable therewith whereby the subject is uniformly illuminated regardless of the position of the camera, and an apron depending from the periphery of said platform and carried by said arms.

12. In a multi-pose photographic apparatus, a platform providing a center posing area for the poser, bodily movable supporting means adapted to move around said center posing area, a camera, a reflector and a light source all mounted substantially the same radial distance from the center of said posing area on said supporting means and adapted to focus onto said center posing area, and means for making selected camera exposures at intervals while said bodily movable supporting means is moved in intermittent steps around said posing area.

13. In a multiple pose photographic apparatus, a platform providing a central posing area, a chair placed in said area, a bodily movable camera arranged to move around said chair, a bodily movable background having a photographing surface mounted substantially vertical with respect to the seat of said chair located directly opposite said camera and arranged to move around said chair, means for moving said background when said camera is moved so that regardless of the position of the camera in respect to the said central posing area the angle of the photographing surface of said background remains unchanged relative to the position of said camera.

LUTHER G. SIMJIAN.